United States Patent [19]

Beimgraben

[11] Patent Number: 4,515,011
[45] Date of Patent: May 7, 1985

[54] TORQUE TRANSMITTING AND INDICATING DEVICE FOR WELL DRILLING APPARATUS

[75] Inventor: Herbert W. Beimgraben, Houston, Tex.

[73] Assignee: Baker Oil Tools, Inc., Orange, Calif.

[21] Appl. No.: 492,188

[22] Filed: May 6, 1983

[51] Int. Cl.³ .................... E21B 47/00; G01L 3/14
[52] U.S. Cl. .................... 73/151; 73/862.32
[58] Field of Search ............ 73/151, 151.5, 862.32, 73/862.33

[56] References Cited

U.S. PATENT DOCUMENTS

| | | | |
|---|---|---|---|
| 774,931 | 11/1904 | Bucknam | 73/862.32 |
| 3,154,941 | 11/1964 | Westbrook | 73/862.32 |
| 3,855,857 | 12/1974 | Claycomb | 73/151 |
| 3,864,968 | 2/1975 | Anderson | 73/151 |
| 3,929,009 | 12/1975 | Lutz et al. | 73/862.35 |

FOREIGN PATENT DOCUMENTS 0206031  11/1923  United Kingdom ............ 73/862.32

*Primary Examiner*—Charles A. Ruehl
*Attorney, Agent, or Firm*—Norvell & Associates

[57] ABSTRACT

A downhole device which can be incorporated into the tubular drill string transmitting torque to the drilling bit and concurrently providing an indication of the torque transmitted. A telescopically interrelated housing and mandrel have their non-telescoped ends connected with the rotating power source and the drilling bit. A resilient torque transmitting mechanism, such as a helical spring, is mounted between the mandrel and the annular housing to transmit torque between such elements but at the same time produce an angular displacement of one element with respect to the other. A fluid passage is provided through the bores of the telescopically interrelated mandrel and the housing and communicating apertures are formed in the adjacent ends of such bores to produce a variable orifice whose pressure drop due to the flow changes as a function of the angular displacement of the housing and mandrel, hence as a function of the torque being transmitted.

13 Claims, 7 Drawing Figures

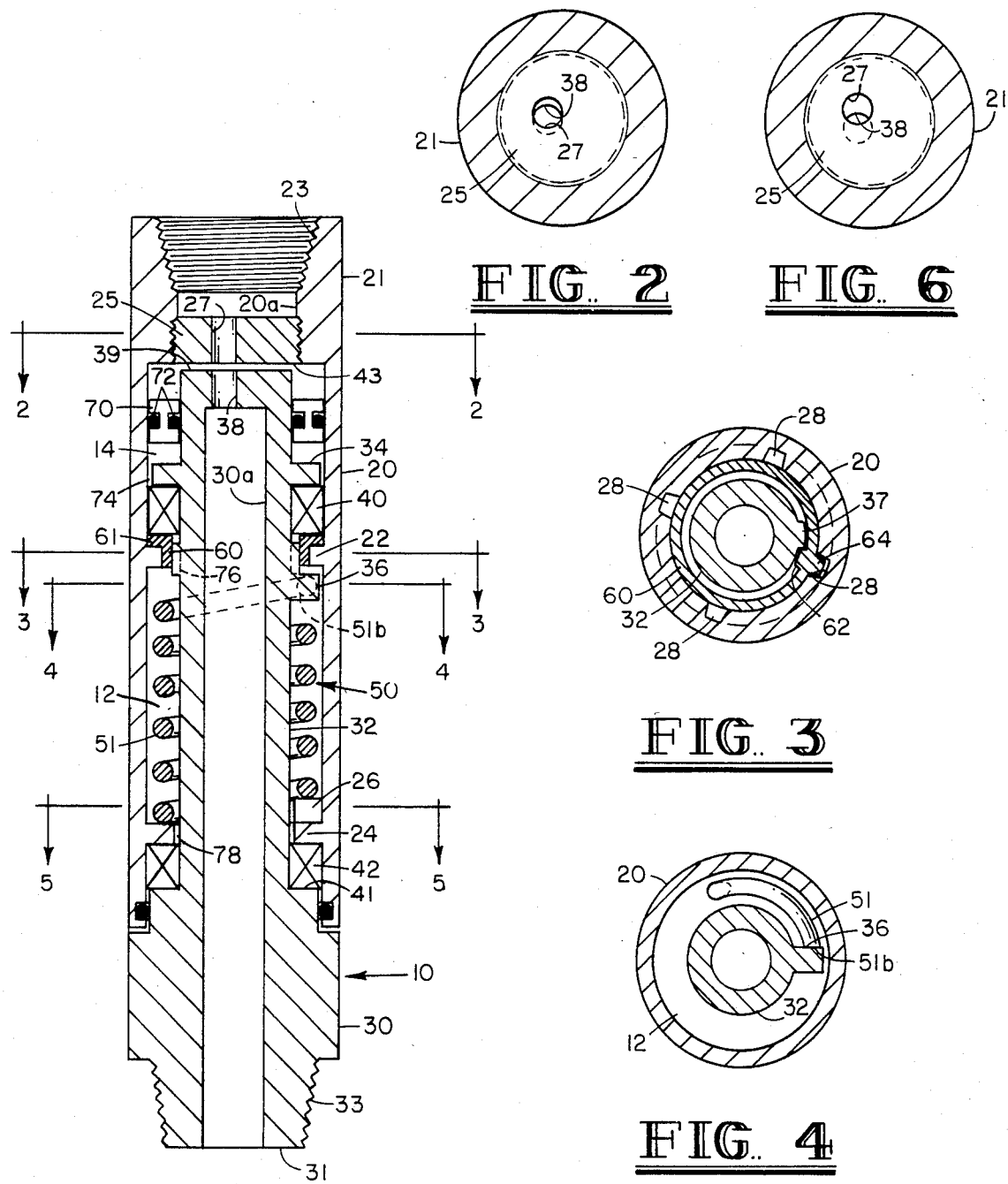

TORQUE TRANSMITTING AND INDICATING DEVICE FOR WELL DRILLING APPARATUS

BACKGROUND OF THE INVENTION

1. FIELD OF THE INVENTION

This invention relates to a downhole device which can be incorporated into the tubular drill string for transmitting torque to the bit and concurrently providing an indication of the torque transmitted.

2. DESCRIPTION OF THE PRIOR ART

In the drilling of subterranean wells, it is very desirable that the operator on the surface be apprised of the approximate torque at the rotating drill bit or in the tubular string. This requirement exists whether the drill bit is powered by a downhole motor or by a rotating drill string.

Also, since the speed of a downhole turbine motor is proportional to the generated torque, knowing the torque in this case will provide necessary information on the bit speed. By design, turbine bit speeds can be extremely high and if uncontrolled can lead to very rapid bit failure.

To directly measure the torque of a downhole drilling string is a difficult task, not only because the measurement must be effected at a distance ranging from 5000 to 10,000 feet or more from the surface but also the environmental conditions surrounding a downhole drilling string are not conducive to the utilization of conventional torque measuring devices. The shocks and impacts encountered by the drilling bit, accompanied with the fact that it is generally immersed in a drilling mud, prevents the application of conventional torque measuring equipment.

SUMMARY OF THE INVENTION

The invention provides a torque transmitting and indicating device for use with well drilling bits which will provide a continuous, reliable indication of the torque transmitted to the downhole bit by any rotating power source. Additionally, if the torque is known, the rotational speed of a downhole turbine can be readily interpolated. It is accordingly a primary object of this invention to provide a downhole torque indicating device for a well drilling bit which will provide a signal at the well surface which is proportional to the torque being transmitted to the drilling bit by its rotating power source, and alternately accurately indicates the speed of the drilling bit where the power source is a downhole turbine motor.

A torque transmitting and indicating device embodying this invention comprises an annular housing which telescopically receives one end of a mandrel. Torque is transmitted between the annular housing and the mandrel by a resilient connection which permits an angular displacement of the housing relative to the mandrel as a function of the torque transmitted. Fluid passages for a pressurized power fluid, such as drilling mud, are provided through the centerbore of the housing and a centerbore in the mandrel. In the preferred embodiment, the axially adjacent ends of such centerbores are provided with constrictions so that any angular variation in the position of the mandrel relative to the housing will result in a change in effective flow area through the constrictions. This in turn will produce a pressure signal in the power fluid which can be either sensed or gauged at the downhole location or indicated by a variation in fluid pressure at the well surface.

BRIEF DESCRIPTION OF THE DRAWINGS

FIG. 1 is a vertical sectional view of a torque transmitting and indicating device embodying this invention.

FIG. 2 is a sectional view taken on the plane 2—2 of FIG. 1.

FIG. 3 is a sectional view taken on the plane 3—3 of FIG. 1.

FIG. 4 is a sectional view taken on the plane 4—4 of FIG. 1.

FIG. 5 is a sectional view taken on the plane 5—5 of FIG. 1.

FIG. 6 is a view similar to FIG. 2 but showing the effect of torque variation on the position of the flow constricting apertures.

DESCRIPTION OF THE PREFERRED EMBODIMENT

Figure 7:
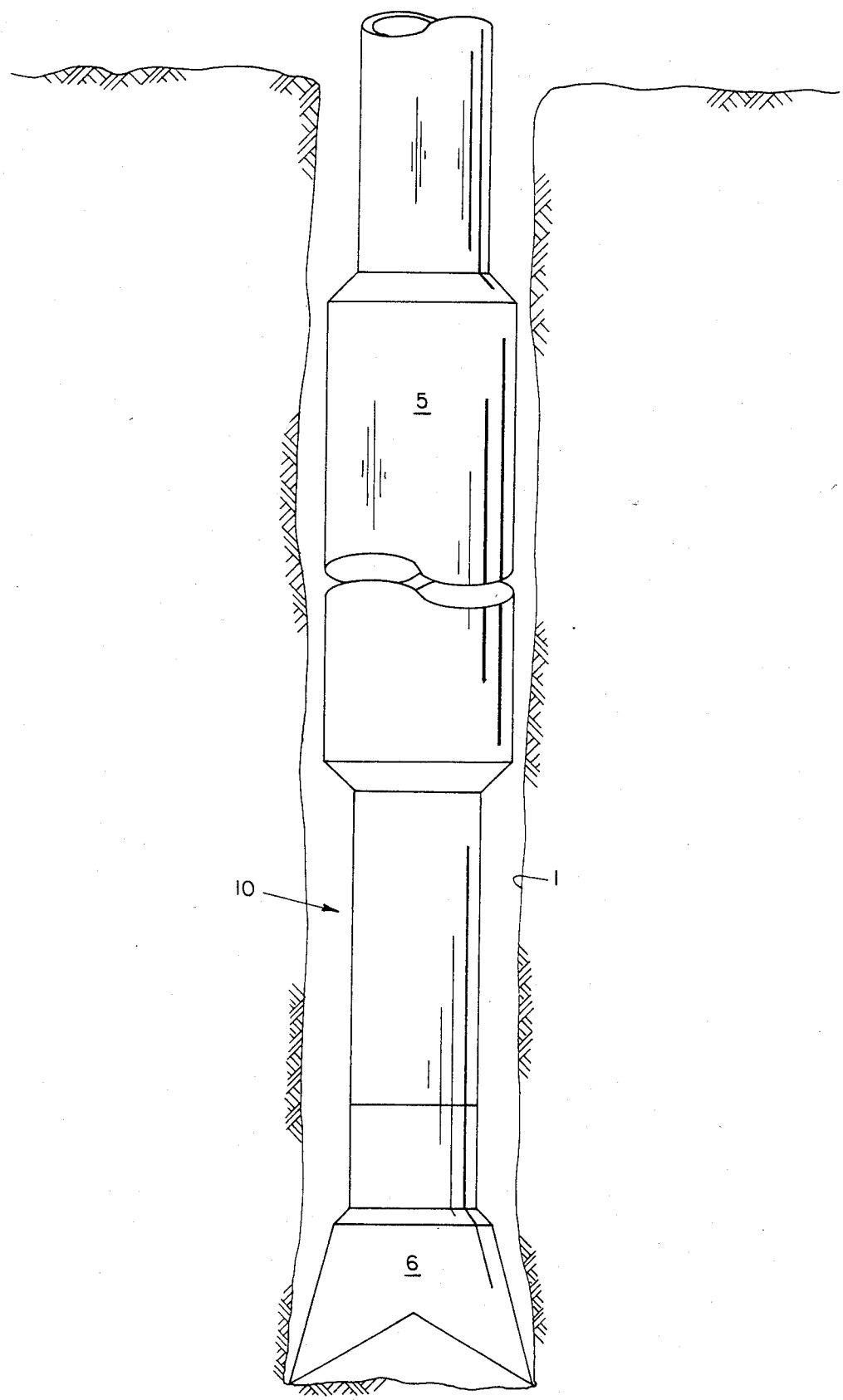
FIG. 7 is a schematic view illustrating the connection of the torque transmitting and indicating device of FIG. 1 between a downhole turbine motor and the drilling tool.

Referring to the drawings, a conventional power source, such as a fluid turbine motor 5, is shown in a downhole position within a well bore 1 and connected to a drilling tool 6 by a torque transmitting and indicating device 10. The torque transmitting and indicating device 10 embodying this invention comprises an annular housing 20 which is telescopically interrelated with a hollow mandrel 30. An elongated end portion 32 of mandrel 30 is inserted within one end of the annular housing 20 and mounted therein for relative angular displacement by conventional combined radial and thrust bearings 40 and 42. Upper bearing 40 is disposed between an inwardly projecting annular abutment 22 formed on the interior of annular body 20 and an exterior annular abutment 34 formed on the inserted end 32 of the hollow mandrel 30. The lower bearing 42 is disposed between a radial shoulder 41 forming the juncture of the inserted end portion 32 with the main body portion of mandrel 30, and an internally projecting, annular abutment 24 formed on the annular body 20. Thus the lower thrust bearing 42 will absorb compressive forces exerted between the annular body 20 and the hollow mandrel 30, while upper thrust bearing 40 will absorb tensile forces between such elements.

The nontelescoped ends 21 and 31 of annular housing 20 and hollow mandrel 30 are respectively provided with threads 23 and 33 for securement into the tubular drill string to transmit torque from rotating power source. It makes no difference whether the rotating power source is a turbine motor or a rotating work string. In the preferred embodiment the device 10 is positioned so as to transmit operating torque from the rotating power source to the rotatable drilling bit.

Such torque is transmitted between the annular housing 20 and the hollow mandrel 30 by means of a resilient connection 50 which, while transmitting torque between such elements, will also produce a relative angular displacement of the annular housing 20 with respect to the hollow mandrel 30 in proportion to the magnitude of the torque transmitted. The resilient connecting means 50 may conveniently comprise a helical spring 51 disposed in an annular recess 12 defined between the annular housing 20 and the inserted end 32 of the hollow mandrel 30 and lying intermediate the outwardly projecting abutment 34 on the hollow mandrel 30 and the inwardly projecting abutment 24 provided on the annular housing 20. Helical spring 51 has one end 51a thereof disposed in a vertical plane and engagable with the vertical side surface of an internally projecting lug 26 formed on the upper portion of the annular abutment 24 (FIG. 5). The other end 51b of spring 51 is likewise provided with a vertical face which abuts a vertical side surface of an external lug 36 provided on the inserted end portion 32 of the hollow mandrel 30 (FIG. 4).

The strength of the spring 51 is preferably selected so as to limit the relative angular displacement of the annular body 20 with respect to the hollow mandrel 30 to a value less than 360°, and preferably less than 270°, as the transmitted torque ranges from zero up to the maximum capability of the rotating power source. An additional positive limitation on such relative rotation is provided through the cooperation of a radially projecting lug 37 (FIG. 3) formed on the periphery of the inserted end 32 of the hollow mandrel 30 with an internally projecting lug or abutment 62 provided on a ring 60 which is mounted within the bore of the annular housing 20. Ring 60 is preferably of right angle configuration in cross section and has a horizontal annular flange portion 61 disposed between the upper bearing 40 and the internally projecting upper annular abutment 22 formed in the annular housing 20. The angular position of the ring 60 relative to the annular housing 20 may be selectively adjusted through the cooperation of an outwardly projecting lug 64 (FIG. 3) formed on such ring with any selected one of a plurality of peripherally disposed vertical slots 28 (FIG. 3) formed in the inner periphery of the annular abutment 22. It will thus be seen that the lugs 62 and 37 cooperate to positively limit angular displacement of the annular housing 20 with respect to the hollow mandrel 30 to a value less than 360°. Moreover, by selecting a particular vertical slot 28 for engagement by the outwardly projecting lug 64 on ring 60, a predetermined amount of preloading may be imparted to the torque transmitting spring 51.

Thus lugs 26 and 36 comprise a first pair of abutments transmitting torque between the housing 20 and mandrel 30 and lugs 62 and 37 comprise a second pair of abutments on housing 20 and mandrel 30 controlling the preloading of spring 51.

While a helical spring represents the preferred manner of effecting a torque transmitting connection between the annular housing 20 and the hollow mandrel 30, those skilled in the art will readily appreciate that other resilient configurations could be employed, including an annular mass of elastomeric material which has its inner and outer surfaces respectively bonded or otherwise rigidly secured to the opposed surfaces of the annular housing 20 and the hollow mandrel 30.

The device 10, when assembled as heretofore described, defines an axially extending fluid passage entirely through the device for the transmission of a suitable power fluid, such as drilling mud, to the rotatable drilling bit (not shown). In accordance with this invention, the effective flow area of the axial flow passage jointly defined by the bore 20a of the annular body 20 and the bore 30a of the hollow mandrel 30 is constricted by a variable orifice mechanism as a function of the torque being transmitted between annular housing 20 and hollow mandrel 30. Such constriction may be conveniently defined in hollow mandrel 30 by an end cap 39 formed on the extreme end of the inserted end portion 32 of hollow mandrel 30. Immediately adjacent the end cap 39, the bore 20a of the annular housing 20 may be similarly constricted by the threaded insertion of an externally threaded ring 25. Ring 25 is provided with an axially extending fluid passage 27 which is connectable with an axially extending passage 38 defined by the internally projecting flange or end cap 39.

The apertures or passages 27 and 38 are disposed in nonconcentric relationship to each other so that the effective flow area through the two passages functions as a continuous sensor of the angular displacement of the annular housing 20 with respect to the hollow mandrel 30. It therefore follows that the effective flow passage area through the apertures 27 and 38 will be varied as a function of the torque transmitted from the rotating power source to the rotatable drilling bit.

For example, assuming that FIG. 2 represents the position of the elements of the torque transmitting device 10 when minimal torque is being transmitted, it will be seen, by reference to FIG. 2, that the flow passage area through the nonconcentric apertures 27 and 38 is almost at a maximum. In contrast, as the torque increases, and the annular housing 20 is angularly shifted relative to the hollow mandrel 30, the position of the nonconcentric apertures 27 and 38 becomes as shown in FIG. 6 wherein the effective fluid flow passage has been substantially reduced.

As is well known to those skilled in the art, the effect of introducing such a variable orifice in the path of the power fluid will result in a variation in pressure of the power fluid which is detectable at the well surface. With the specific configuration of apertures 27 and 38 illustrated in the drawings, the power fluid pressure will increase in proportion to the increasing torque being transmitted. Other arrangements of the apertures 27 and 38 will be immediately obvious to those skilled in the art wherein, for example, the power fluid pressure detected at the surface can be caused to decrease as the transmitted torque increases, by presetting and offsetting aperture 27 counterclockwise relative to aperture 38, allowing apertures 27 and 38 to come into alignment with increasing torque. In an alternative arrangement, the power fluid pressure detected at the surface can be caused to decrease as the transmitted torque builds to an optimum range. Should, however, the transmitted torque continue to increase, the effective flow passage area of the two nonconcentric apertures 27 and 38 can be designed so as to decrease, thus causing an increase in the power fluid pressure observed by the operator at the surface of the well and indicating to him that it's time to pick up or allow the bit to drill off. By watching the standby pressure of the power fluid, the operator may drill consistently at an optimum torque and achieve long and efficient drilling runs.

If desired, a corollary benefit may be achieved from the variable torque orifice incorporated in the device 10 as heretofore described. A small portion of the power fluid flowing through the orifice may be utilized to maintain pressure on a lubricant fluid reservoir for supplying lubricant fluid to the combined radial and thrust bearings 40 and 42. Thus, an annular chamber 14 is defined between the extreme upper end of the inserted end portion 32 of the hollow mandrel 30 and the adjacent interior bore wall of the annular housing 20. Chamber 14 is divided by a floating piston 70 having a pair of annular seals 72 respectively engaging the outer wall of the inserted mandrel end portion 32 and the bore wall of the housing 20. The lower portion of the chamber 14 contains lubricant fluid which is transmitted to the bearings 40 and 42 by fluid conduits 74 and 76, passing through the chamber 12, within which the torque transmitting resilient connection spring 51 is positioned, and thence through conduit 78 to the lower bearing 42. The upper portion of the chamber 14 is connected by an axial spacing 43 between the inserted end 32 of the hollow mandrel 30 and the flow constricting ring 25, hence is connected to the juncture point of the two nonconcentric fluid flow apertures 27 and 38. Thus, a reduced pressure portion of the power fluid may be imposed on the upper surface of the piston 70 to maintain pressure on the lubricant fluid contained in the lower portion of the chamber 14.

Although it is not shown, end cap 39 formed on the extreme end of the inserted end portion 32 of hollow mandrel 30, may be urged against ring 25 by springs or similar means (not shown), thus eliminating axial spacing 43. In such case, a fluid conduit (not shown) would be provided either from end cap 39 or above ring 25 to the upper portion of chamber 14, thus imposing fluid pressure on the upper surface of the piston 70.

In the preferred embodiment depicted herein, the apparatus responsive to torque transmitted by a rotating power source is disposed between rotating power source and the drill bit. If a downhole power source such as a turbine is used, the apparatus may be disposed between the turbine and a nonrotating portion of the drill string. In this portion, the apparatus will be responsive to the reaction torque of the turbine, which is essentially the same as the torque transmitted to the drill bit. Indeed the mandrel and the housing need only be keyed to the power source and a portion of the drill string.

Although the invention has been described in terms of specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. A downhole apparatus responsive to the torque transmitted by a rotating power source to a drill bit in drilling tool, the apparatus comprising: an annular housing; a mandrel having one end thereof telescopingly mounted with respect to one end of said annular housing, said housing and said mandrel being disposed between, and each keyed to one of, the rotating power source and a portion of the drilling tool; resilient means opposing relative rotation of said annular housing and said mandrel, and thereby between the rotating power source and the portion of the drilling tool, annular flexure of the resilient means producing angular displacement between said housing and said mandrel as a function of torque transmitted from the rotating power source by said resilient means; and means responsive to angular displacement between said mandrel and said housing producing a fluid pressure signal for gauging the torque transmitted by the power source.

2. A downhole torque transmitting and indicating apparatus disposed in a drilling tool with a well drilling bit responsive to a rotating power source, comprising: an annular housing; a hollow mandrel having one end thereof telescopingly mounted with respect to one end of said annular housing; means with respect to the other end of said mandrel for connecting to one of the drilling tool and rotating power source; means with respect to the other end of said housing for connection to the other of the drilling tool and the rotating power source; resilient means opposing relative rotation of said annular housing and said mandrel, thereby producing angular displacement of said annular housing and said mandrel as a function of torque transmitted from the rotating power source by said resilient means; and means defining a variable area drilling mud passage intermediate the interior bore of said mandrel and the interior of said annular housing in response to said angular displacement, thereby generating a fluid pressure signal proportional to the torque transmitted to the drilling tool.

3. The apparatus defined in claim 2 further comprising bearing means disposed between the external periphery of said inserted end of said mandrel and the interior bore of said annular housing, maintaining axial alignment of said mandrel and housing and additionally absorbing thrust forces in an upward and downward direction, and wherein said resilient means comprises a helical spring disposed intermediate the exterior of said inserted end portion of said mandrel and the interior bore of said annular housing, a first abutment means on said housing for engaging one end of said helical spring and a second abutment surface on the exterior of said mandrel engaging the other end of said helical spring, whereby torque is transmitted between said annular housing and said hollow mandrel by said helical spring.

4. The apparatus defined in claim 3 wherein said bearing means comprise a pair of vertically spaced bearings respectively disposed above and below the axial ends of said helical spring.

5. The apparatus defined in claim 3 or 4 further comprising an annular fluid chamber defined between the exterior of said inserted end of said mandrel and the bore of said annular housing, an annular piston floatingly mounted in said annular chamber to divide same into two separate chambers, first conduit means connecting one of said separate chambers to supply lubricant fluid to said thrust bearings, and second conduit means connecting the other of said separate chambers to one of said fluid passages, thereby applying fluid pressure to the lubricant fluid through said annular piston.

6. The apparatus defined in claim 2 wherein said resilient means comprises a helical spring disposed intermediate the exterior of said inserted end portion of said mandrel and the internal bore of said annular housing, a first abutment means on said housing for engaging one end of said helical spring, a second abutment surface on the exterior of said mandrel engaging the other end of said helical spring, a third abutment means on the exterior of said mandrel, a fourth abutment means on said annular housing, said third and fourth abutment means being urged into engagement by said helical spring, and means for selectively varying the relative angular position of said third and fourth abutment means, thereby permitting selective torsional preloading of said helical spring.

7. The apparatus defined in claim 6 wherein said fourth abutment means comprises a ring angularly adjustably secured in said annular housing, said ring having a projection engageable with said third abutment means.

8. A downhole torque transmitting and indicating apparatus disposed relative to a well drilling bit and a rotating power source, comprising: an annular housing;

a mandrel having one end thereof telescopingly mounted with respect to one end of said annular housing; means with respect to the other end of said mandrel for connection to one of the drilling string and the rotating power source; means with respect to the other end of said housing for connection to one of the drilling string and the rotating power source; resilient means opposing relative rotation of said annular housing and said hollow mandrel, thereby producing angular displacement of said annular housing and said hollow mandrel as a function of torque transmitted from the rotating power source: a first fluid passage in said annular housing; a second fluid passage in said mandrel; and variable orifice means connecting said first and second fluid passages: the flow area of said orifice means being varied by relative angular displacement of said housing and said mandrel, whereby the flowing of fluid through said first and second fluid passages produces a pressure drop across said orifice means proportional to the torque transmitted by the apparatus.

9. The apparatus defined in claim 8 wherein said variable means comprises axially adjacent apertures respectively formed in said annular housing and said mandrel, at least one of said apertures being nonconcentric relative to the axis of said annular housing, said apertures connecting the axially adjacent ends of said first and second fluid passages.

10. The apparatus defined in claim 8 wherein said variable orifice means comprises a first constriction in said first fluid passage, a second constriction in said second fluid passage axially adjacent to said first constriction, said first and second constrictions respectively defining mutually nonconcentric apertures therethrough.

11. The apparatus defined in claim 8 wherein said variable orifice means comprises a first constriction in said first fluid passage, a second contriction in said second fluid passage axially adjacent to said first constriction, said first and second constrictions respectively defining apertures therethrough which are misaligned by said relative rotation of said annular housing and said hollow mandrel.

12. The apparatus of claim 10 or 11 wherein one of said constrictions comprises a plug angularly adjustably secured in the bore of one of said annular housing and said mandrel and defining an aperture therethrough, thereby permitting adjustment of the angular position of the aperture defined by said plug.

13. The apparatus defined in claim 2, 8, 9, 10, or 11 wherein said resilient means comprises a helical spring disposed intermediate the exterior of said inserted end portion of said mandrel and the interior bore of said annular housing, a first inwardly projecting abutment surface on said housing for engaging one end of said helical spring and a second abutment surface on the exterior of said mandrel engaging the other end of said helical spring, whereby torque is transmitted between said annular housing and said hollow mandrel by said helical spring.

* * * * *